No. 751,290. PATENTED FEB. 2, 1904.
F. JAEGER.
MIRROR.
APPLICATION FILED JUNE 26, 1903.
NO MODEL.

Witnesses:
Arthur Zumpe
Edward Ray

Inventor:
Ferdinand Jaeger
by his attorney

No. 751,290. Patented February 2, 1904.

UNITED STATES PATENT OFFICE.

FERDINAND JAEGER, OF NEW YORK, N. Y.

MIRROR.

SPECIFICATION forming part of Letters Patent No. 751,290, dated February 2, 1904.

Application filed June 26, 1903. Serial No. 163,181. (No model.)

*To all whom it may concern:*

Be it known that I, FERDINAND JAEGER, a citizen of the United States, and a resident of New York city, Brooklyn, county of Kings, and State of New York, have invented certain new and useful Improvements in Mirrors, of which the following is a specification.

This invention relates to a mirror of simple construction which is capable of various adjustments, so that all sides of the head or other object reflected may be readily inspected.

Figure 1:
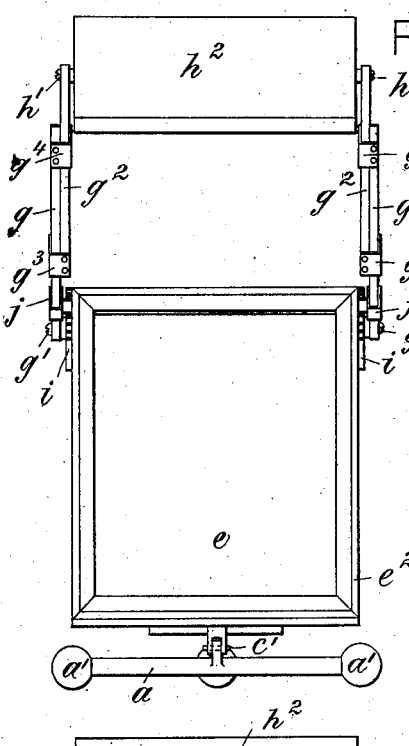
Figure 2:
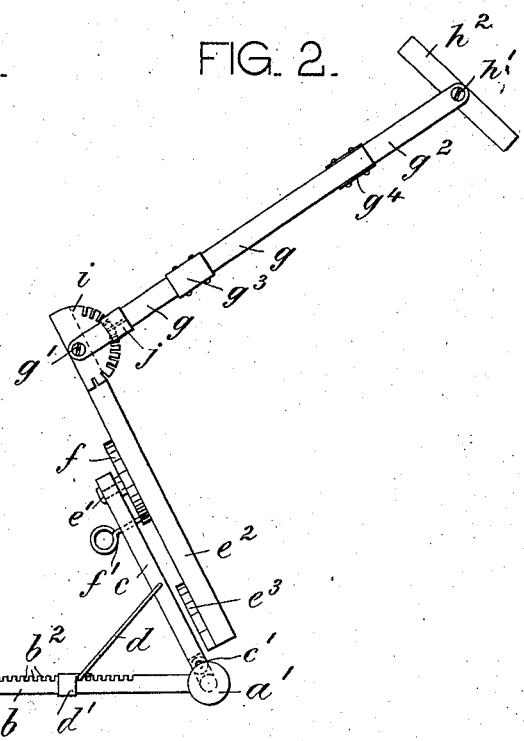
Figure 3:
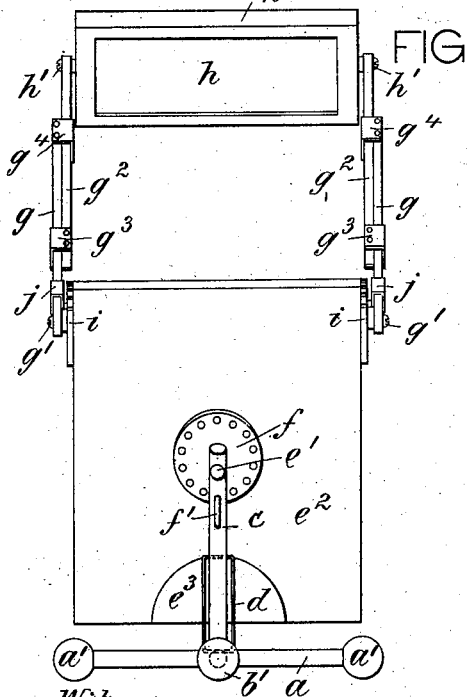

In the accompanying drawings, Figure 1 is a front elevation of my improved mirror; Fig. 2, a side elevation thereof; Fig. 3, a rear view, and Fig. 4 a side elevation, partly in section, showing the parts in a different position.

The base of the mirror is T-shaped, being composed of a front bar $a$, carrying balls $a'$, and of a rearwardly-extending bar $b$, carrying a counterweight $b'$. To the base $a\ b$ is fulcrumed at $c'$ a post $c$, the whole constituting a stand. The post $c$ is provided with a swinging brace or bail $d$, adapted to engage either one of a number of notches $b^2$ of bar $b$. The brace may be locked to the bar $b$ by a slide $d'$, that surrounds the bar and is adapted to be projected over the lower end of the brace, Fig. 2, so that the post may be fixed at any inclination to which it is set.

To the upper end of post $c$ is pivoted by pin $e'$ the frame $e^2$ of a main reflector or mirror $e$, having counterweight $e^3$ and adapted to be tilted in a plane parallel to the axis of the post. Around the pivot $e'$ there is rigidly secured to the frame $e^2$ a perforated disk $f$, adapted to be engaged by a locking-pin $f'$, projecting through a perforation of post $c$, by means of which the mirror $e$ may be locked in position. Near each upper corner there is pivoted to frame $e^2$ by pin $g'$ the lower section $g$ of an extensible arm, the upper section $g^2$ of which is connected to the lower section by slides $g^3\ g^4$. To the upper ends of the upper sections $g^2$ is pivoted by pins $h'$ the frame $h^2$ of an auxiliary reflector or mirror $h$, which is thus rotatable around its own axis and also around the pivots $g'$ of the main reflector $e$. In order to lock the arms $g$, and consequently the auxiliary mirror, in position, the pivots $g'$ are embraced by notched segments $i$, rigidly secured to frame $e^2$ and adapted to be engaged by slides $j$, movable along arms $g$.

In use the post $c$ and mirror $e$ are set at the angle desired and then the arms $g\ g^2$ are swung forward and locked in position by the engagement of the slides $j$ with the notched segments $i$, Fig. 2. The auxiliary reflector will thus be made to face the main reflector, so that all sides of the head or other object interposed may be freely exposed to view.

Figure 4:
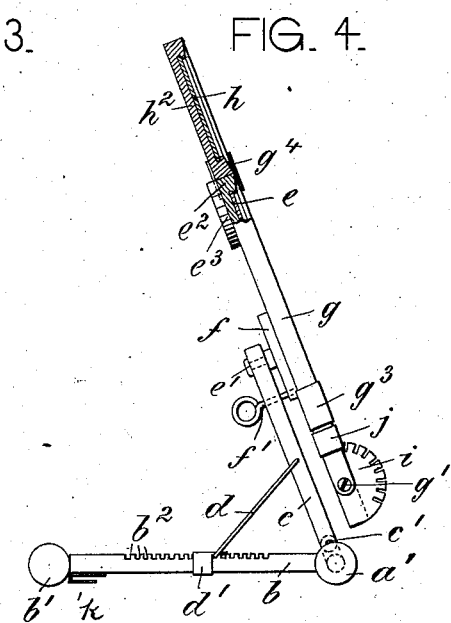

If it is desired to arrange both mirrors in the same plane, the main reflector $e$ is reversed and the arms $g\ g^2$ are swung back and contracted, so that the frame $h^2$ of reflector $h$ will be supported upon the frame $e^2$ of reflector $e$, Fig. 4. In this way the two reflectors will jointly form one large common reflector.

To permit the mirror to be suspended from a wall, the bar $b$ may be provided with a hook $k$.

What I claim is—

1. A mirror composed of a stand, a main reflector pivoted thereto, a pair of arms pivoted to the main reflector, and an auxiliary reflector pivoted to the arms, substantially as specified.

2. A mirror composed of a stand, a main reflector pivoted thereto, means for locking the main reflector in position, a pair of extensible arms pivoted to the main reflector, means for locking said arms in position, and an auxiliary reflector pivoted to the arms, substantially as specified.

3. A mirror composed of a notched base, a post pivoted thereto, a brace on the post adapted to engage the notches, a main reflector pivoted to the post, means for locking the main reflector in position, a pair of extensible arms pivoted to the main reflector, means for locking said arms in position, and an auxiliary reflector pivoted to the arms, substantially as specified.

4. A mirror composed of a base, a pivoted post, means for locking the post in position, a main reflector pivoted to the post, a perforated disk and pin for locking the main reflector in position, a pair of extensible arms pivoted to the main reflector, notched segments and slides for locking said arms in position, and an auxiliary reflector pivoted to the arms, substantially as specified.

Signed by me at New York city, Manhattan, New York, this 25th day of June, 1903.

FERDINAND JAEGER.

Witnesses:
   WILLIAM SCHULZ,
   FRANK V. BRIESEN.